(12) United States Patent
Steger

(10) Patent No.: US 10,059,424 B2
(45) Date of Patent: Aug. 28, 2018

(54) ARRANGEMENT FOR MOVING A DOOR IN SWINGING AND SLIDING MOTIONS

(71) Applicant: AIRBUS HELICOPTERS DEUTSCHLAND GMBH, Donauworth (DE)

(72) Inventor: Justus Steger, Neustadt A.D. Aisch (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 274 days.

(21) Appl. No.: 14/995,383

(22) Filed: Jan. 14, 2016

(65) Prior Publication Data
US 2016/0200416 A1   Jul. 14, 2016

(30) Foreign Application Priority Data

Jan. 14, 2015 (EP) .................................. 15400002

(51) Int. Cl.
*B64C 1/14*      (2006.01)
*E05D 15/48*     (2006.01)
*E06B 3/50*      (2006.01)

(52) U.S. Cl.
CPC .......... *B64C 1/1461* (2013.01); *B64C 1/1438* (2013.01); *E05D 15/48* (2013.01); *E06B 3/5054* (2013.01)

(58) Field of Classification Search
CPC ......... E06B 3/5054; E05D 15/48; B64C 1/14; B64C 1/1407; B64C 1/1415; B64C 1/1423; B64C 1/1438; B64C 1/1461; B60J 5/047
See application file for complete search history.

(56) References Cited

U.S. PATENT DOCUMENTS

| 5,544,449 A * | 8/1996 | Amelio ................. B64C 1/1407 16/352 |
| 6,676,193 B1 * | 1/2004 | Hanagan ................. B60J 5/0472 296/146.11 |
| 6,820,918 B1 * | 11/2004 | DeBono ................. B60J 5/0472 16/289 |
| 8,146,864 B2 | 4/2012 | Koppel et al. |
| 8,870,260 B2 * | 10/2014 | Le Duc .................. B60J 5/0484 296/146.11 |
| 2002/0139897 A1 | 10/2002 | Erben et al. |

(Continued)

FOREIGN PATENT DOCUMENTS

| DE | 10025925 | 11/2001 |
| EP | 1334856 A2 | 8/2003 |

(Continued)

OTHER PUBLICATIONS

European Search Report for European Application No. EP 15400002, Completed by the European Patent Office dated Jun. 23, 2015, 6 Pages.

*Primary Examiner* — Benjamin P Lee
(74) *Attorney, Agent, or Firm* — Brooks Kushman P.C.

(57) ABSTRACT

The present invention aims at providing an arrangement for moving a door in both a swinging and a sliding manner, in which a pivoting means allows the rotation of the door around at least two axes of rotation—a slide axis around which the pivoting that allows the sliding motion takes place, and a swing axis, further passing through a swing point of a guiding means intended for allowing the door to slide over a guiding rail, around which the door swings.

17 Claims, 3 Drawing Sheets

(56) References Cited

U.S. PATENT DOCUMENTS

| | | | |
|---|---|---|---|
| 2004/0187263 A1 | 9/2004 | Hoffman | |
| 2005/0140145 A1* | 6/2005 | George | B60J 5/047 292/202 |
| 2005/0285429 A1* | 12/2005 | Valois | B60J 5/0472 296/146.11 |
| 2010/0252682 A1 | 10/2010 | Pahl | |
| 2014/0059826 A1* | 3/2014 | Schlipf | B64C 1/14 29/426.1 |
| 2016/0009357 A1* | 1/2016 | Christenson | B64D 11/02 49/143 |
| 2016/0214701 A1* | 7/2016 | Probst | B64C 1/1415 |

FOREIGN PATENT DOCUMENTS

| | | | |
|---|---|---|---|
| EP | 1334856 A3 | 6/2005 | |
| GB | 1432687 | 4/1976 | |
| JP | 3082629 B2 * | 8/2000 | B60J 5/047 |

* cited by examiner

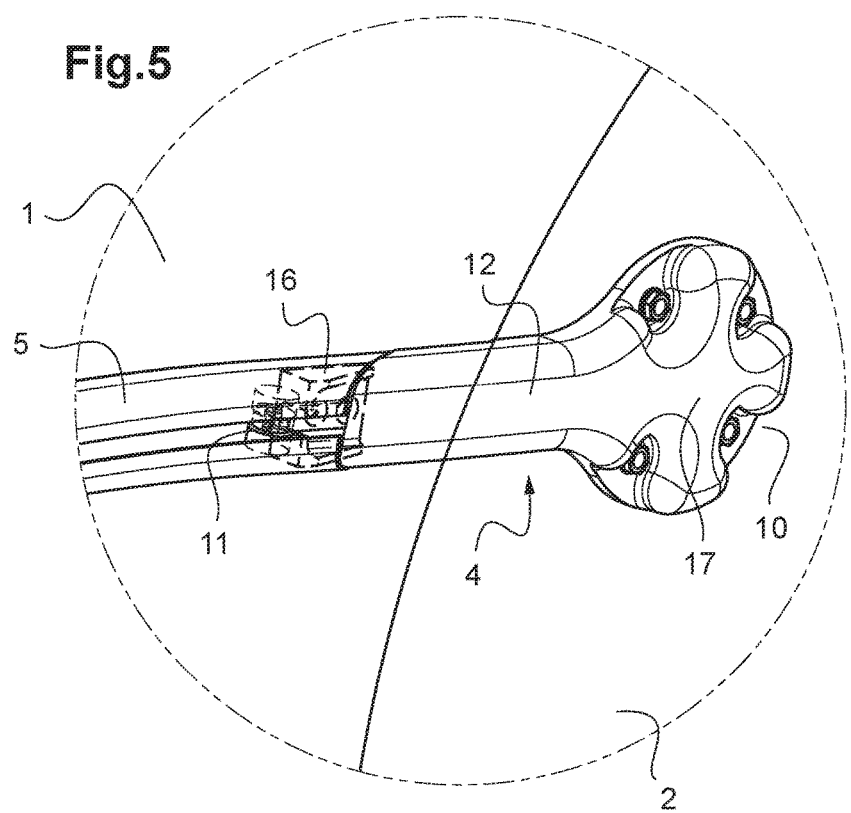
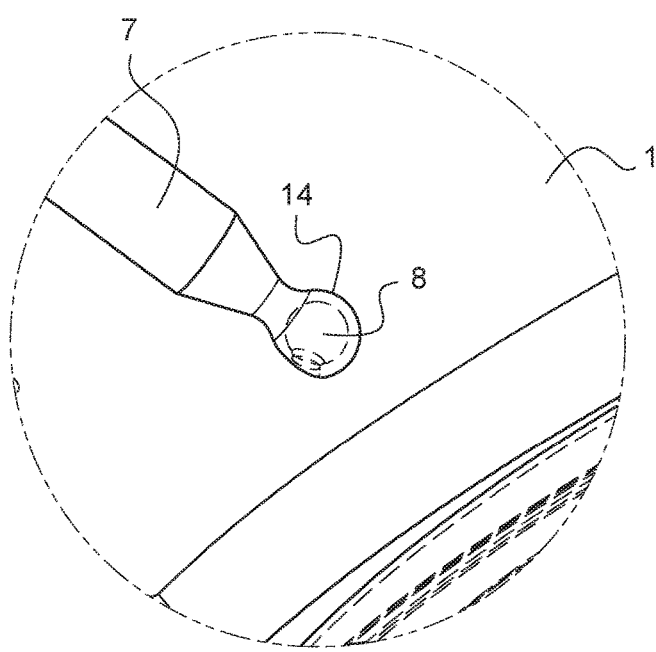
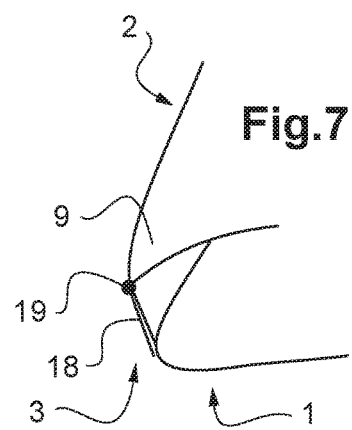

ARRANGEMENT FOR MOVING A DOOR IN SWINGING AND SLIDING MOTIONS

CROSS REFERENCE TO RELATED APPLICATION

This application claims priority to European patent application No. EP 15 400002.0 filed on Jan. 14, 2015, the disclosure of which is incorporated in its entirety by reference herein.

BACKGROUND OF THE INVENTION (1) Field of the Invention

The present invention relates to an arrangement for moving a door which allows the door to move in sliding and swinging motions.

(2) Description of Related Art

Several types of mechanisms for opening doors, particularly doors for aircrafts, are known in the prior art.

A type of mechanism is that characterizing sliding doors. The door is mounted on rails that guide it along the fuselage or other structure from a closed to an open position. This requires, normally, at least three guiding rails arranged in a particular manner, which limits the particular surface geometry of the fuselage or structure on which the arrangement can be mounted and the geometry of the door opening. U.S. Pat. No. 8,146,864 describes a sliding door for helicopters.

A further type of mechanism, intended for swinging doors, comprises two or more hinges that define an axis around which the door opens. Although the arrangement is simple and adaptable to several geometries, the door may protrude far from the fuselage or structure, which requires a wide area to open the door.

A different mechanism has a supporting arm which moves the door outward and then alongside the fuselage or structure in a circular motion. The door is kept parallel to the fuselage or structure by one or more guide arms. Due to the fact that the full weight of the door must be lifted by the supporting arm up to a significant distance from the door opening, which entails a large load moment on the supporting arm, this arrangement is usually heavy and bulky. An example can be found in US20020139897.

BRIEF SUMMARY OF THE INVENTION

The present invention aims at providing an arrangement for advantageously moving a door, in both a swinging and a sliding manner, suitable for being installed on fuselages or structures with different, complex geometries and without the need for large or heavy components.

This inventive arrangement comprises:

pivoting means attachable to the structure and to a first attachment point of the door, the pivoting means being suitable for allowing a rotation of the door around a plurality of axes of rotation of the pivoting means, said plurality of axes of rotation comprising a slide axis and at least one swing axis, a guiding rail attachable to the structure, guiding means attachable to a second attachment point of the door and comprising a slider for moving along the guiding rail, the guiding means being suitable for allowing the door to slide over the guiding rail while pivoting around the slide axis, and for allowing the door to swing about the at least one swing axis, said at least one swing axis passing through a swing point of the guiding means.

The pivoting means is one of the at least two connections for attaching the arrangement to the door. Such means allows the pivoting of the door about a plurality of axes referred to in this application as slide axis and at least one swing axis.

The at least one swing axis is the axis around which the door rotates when in a swinging motion. This motion is possible because the guiding means comprises a swing point, playing the role of a hinge, through which the swing axis passes.

The guiding means is intended for being another of the at least two connections between the arrangement and the door, and, besides, it comprises a slider for moving along a guiding rail which is in turn attachable to the structure. The swing point may be located at different positions of the guiding means. In an embodiment, the swing point is located at the slider, so that the door swings about a swinging axis passing through the slider and through at least a point of the pivoting means, and the remaining part of the guiding means remains integral with the door during the swinging motion. Alternatively, the swing point may be located at the point of the guiding means suitable for the attachment to the door.

Since the at least one swing axis passes through a swing point of the guiding means, and the guiding means comprises a slider for moving along the guiding rail, which causes that the swing point varies its position during the sliding motion, the at least one swing axis also moves during such sliding motion.

The arrangement is suitable for allowing the door to slide over the structure since the pivoting means further comprise a slide axis around which the door can pivot when the guiding means moves along the guiding rail.

The provision of the pivoting means that permit the rotation of the door around a plurality of axes of rotation can be achieved by means of different embodiments.

In an embodiment, the pivoting means comprises a spherical bearing suitable for allowing a free rotation of the door around the center of rotation of such spherical bearing. Accordingly, the slide axis and the at least one swing axis pass through the center of rotation of the spherical bearing. This configuration is advantageous in that one structural element, which, moreover, is simple, light and cheap, is sufficient to allow the rotation of the door in both the swinging and the sliding movements.

In an alternative embodiment, the pivoting means comprise an articulated joint in turn comprising at least a first and a second joint extensions, the first joint extension extending along the slide axis and the second joint extension extending along the at least one swing axis. Differently to the example of the spherical bearing, the rotation takes place around two axes articulately connected, and not around a single point. In a particular example of this embodiment, a longitudinal axis is provided so that the articulated joint is suitable for allowing a movement around three axes. In any case, this embodiment's mechanism is also a simple, cheap and light alternative to allow the rotation of the door in both the swinging and the sliding movements.

The plurality of axes of rotations of the pivoting means permits the rotation of the door around such plurality of axes when attached to the arrangement by the first attachment point. This rotation in turn makes it possible that the sliding motion of the door can be achieved using only one guiding rail attachable to the structure. Thus, the inventive arrangement can be used on complex structure geometries.

As has been explained, the arrangement is further advantageous in that it is formed by light, simple components. This is a consequence of the fact that the way of functioning of the arrangement does not exert excessive loads on the components of the arrangement, and that the moments generated by, for instance, the weight of the components are small, since the lever arms are configured for being small as well.

In spite of the simplicity of its parts, the arrangement does present the advantages of both the swinging doors and the sliding doors of the prior art, that is, the access from the outside of a vehicle or of another structure is easy and fast, as the arrangement allows the door to open conventionally in a swinging manner. However, once the door has been swung out, it can be slid away from the opening of the structure and then folded back to a position closer to the structure, therefore making it appropriate for working around the structure without obstacles and for cases wherein the structure, for example that of a vehicle, is stored in a reduced space.

In an embodiment, the guiding means comprises an arm extending between a first and a second extremities, the first extremity being attachable to the second attachment point of the door, and the second extremity comprising the slider. In the embodiment wherein the swing point is located at the slider, the door, the first extremity and the arm of the guiding means are suitable for moving integrally. In an alternative embodiment, the swing point is located at the first extremity of the arm.

In another embodiment, the guiding rail is a curve on a sphere. This geometry of the rail is suitable for the movement of the door around the slide axis. In the embodiment where the pivoting means comprises a spherical bearing, the center of the sphere is normally the center of the spherical bearing, whereas in the embodiment where the pivoting means comprises an articulated joint, the center of the sphere is usually located at a point of the slide axis of the articulated joint.

In yet another embodiment, the arrangement further comprises a guiding rod articulately attachable both to the structure and to a third attachment point of the door. This guiding rod is suitable for providing guidance of the door such that the door can follow a predetermined path.

In an example of this embodiment, the guiding rod extends between a first end and a second end, the first end being articulately attachable to the structure by means of a first pivoting link, and the second end being articulately attachable to the third attachment point of the door by means of a second pivoting link. The pivoting links in the articulations enable the relative rotation of the guiding rod with respect to the structure and to the door, which permits the adequate movement of the guiding rod when the door swings or slides. In yet a more particular example of this embodiment, the first and second pivoting links comprise auxiliary spherical bearings so as to allow the relative rotation of the guiding rod with respect to the structure and to the door.

In another embodiment, at least one stopper is provided at least at one point of the guiding rail for impeding a further movement of the slider along the guiding rail. For instance, two stoppers can be provided, one at each end of the guiding rail, for avoiding that the slider gets out of the guiding rail.

In a further embodiment, locking means are provided for fixing the position of the door at any specific position.

It is also an object of the invention to provide a door assembly comprising a door and any of the above described arrangements.

The arrangement of the inventive door assembly comprises:

pivoting means attachable to the structure and attached to a first attachment point of the door, the pivoting means being suitable for allowing a rotation of the door around a plurality of axes of rotation of the pivoting means, said plurality of axes of rotation comprising a slide axis and at least one swing axis, a guiding rail attachable to the structure, guiding means attached to a second attachment point of the door and comprising a slider for moving along the guiding rail, the guiding means being suitable for allowing the door to slide over the guiding rail while pivoting around the slide axis, and for allowing the door to swing about the at least one swing axis, said at least one swing axis passing through a swing point of the guiding means.

Since the inventive door assembly comprises the inventive door arrangement, all the explained technical advantages are also relevant to the assembly.

In a particular embodiment of the door assembly, the door comprises a door edge having at least a first and a second corners, the first attachment point of the door being located at said first corner and the second attachment point of the door being located at said second corner. This way, the swinging movement of the door can be carried out in a simple manner, as the points acting as hinges are attached to consecutive corners of the door.

In an example of this embodiment, the door assembly further comprises a guiding rod articulately attachable to the structure and articulately attached to a third attachment point of the door, the guiding rod being suitable for providing guidance of the door, wherein the third attachment point of the door is located at the inside of an area defined by the door edge.

It is an additional object of the invention to provide a vehicle comprising the disclosed inventive door assembly.

This vehicle comprises a door assembly in turn comprising a door configured to close an opening of a structure of the vehicle and an arrangement which comprises:

pivoting means attached to the structure and attached to a first attachment point of the door, the pivoting means being suitable for allowing a rotation of the door around a plurality of axes of rotation of the pivoting means, said plurality of axes of rotation comprising a slide axis and at least one swing axis, a guiding rail attached to the structure, guiding means attached to a second attachment point of the door and comprising a slider for moving along the guiding rail, the guiding means being suitable for allowing the door to slide over the guiding rail while pivoting around the slide axis, and for allowing the door to swing about the at least one swing axis, said at least one swing axis passing through a swing point of the guiding means.

Again, the inventive vehicle presents all the advantages of the inventive door assembly and of the inventive arrangement.

In a particular example, the vehicle is an aircraft and the structure of the vehicle is the fuselage of the aircraft.

The above detailed advantages make the invention especially appropriate for aircrafts, and more particularly for rotorcrafts. Aircrafts are in need of lightweight door systems in order to minimize their overall weight, and therefore the power and fuel needed for flight, and also in order to maximize the payload. This invention achieves this purpose and, besides, the folded position of the door once opened reduces the inconveniencies that many conventional doors cause regarding the movement around the aircraft.

In an even more particular example, the aircraft is a rotorcraft, and in yet a further example the door of the rotorcraft is the back door.

In an example of this embodiment, the pivoting means comprises a main body extending between a first edge and a second edge, the first edge being attached to the first attachment point of the door and the second edge being attached to the fuselage. A spherical bearing is located at the second edge so as to allow the free rotation of the door around its center of rotation, through which the slide axis and the at least one swing axis pass. In this embodiment, the second edge is a fixed point of rotation and the main body and the first edge moves integrally with the door. Due to the provision of a main body of sufficient length between the attachments of the pivoting means to the door and to the fuselage, a door that is flush with the fuselage when closed can perform the described sliding and swinging movements, by allowing for a clearance between a door edge and the door opening when the door swings out around the swing axis.

This clearance between the door edge and the door opening—and, therefore, the fuselage—can also be achieved thanks to the form of the guiding means or to the form of the guiding rail, following the same line of reasoning as for the main body of the pivoting means.

The guiding means may have a form suitable for linking the second attachment point to the guiding rail attached to the fuselage when the door is flush with the fuselage. In an example, the form of the guiding means is also configured so as to allow for the clearance when the swinging motion takes place. Alternatively, the guiding rail may have a curvature such that the door separates from the fuselage when there is a sliding motion, starting from the flush position.

The pivoting means can also comprise an auxiliary guiding rail along which the spherical bearing is able to move, so that the first attachment point of the door, moving integrally with the spherical bearing, can be led towards an offset position. The auxiliary guiding rail is in turn attached to the structure. This embodiment is also intended for providing a clearance between the door edge and the door opening that permits carrying out the defined swinging and pivoting movements.

In an embodiment, the clearance and the movements can be enhanced by placing the swing point at the slider, and by allowing a rotation at the swing point around multiple axes.

It is yet another purpose of the invention to provide a method for operating a door of the disclosed inventive vehicle, the method at least comprising the steps of:

swinging the door about an at least one swing axis passing through a swing point of a guiding means and through a point of a pivoting means, so that the door is suitable for opening and closing an opening of a structure and for folding and unfolding with respect to the structure, sliding the door over a guiding rail by means of the pivoting of the door around a slide axis which passes through the pivoting means and by means of the movement along the guiding rail of a slider of the guiding means, the guiding means being attached to the door.

This method presents all the advantages of the inventive arrangement, door assembly and vehicle.

The method allows that once the door is opened and led to a swung out position, it can be folded, by means of a swinging motion around the swing axis, to a position closer to the structure of the vehicle, which makes the method advantageous for working around the vehicle when there are space constraints. The step of the folding—or of a subsequent unfolding—of the door can be carried out at any moment before, during or after the sliding of the door, no matter the position of the slider along the guiding rail. The movement of the slider along the guiding rail implies a corresponding movement of the swing axis, since the swing axis passes through a swing point of the guiding means. The versatility of the door for folding and unfolding leads to the commented advantage of the lack of obstacles when working around the vehicle. The method also permits that the door can be swung back to close the opening of the structure, when the slider is located at an end of the guiding rail.

These and other features and advantages of the invention will become more evident from the following detailed description of preferred embodiments, given only by way of illustrative and non-limiting example, in reference to the attached figures:

BRIEF DESCRIPTION OF THE SEVERAL VIEWS OF THE DRAWINGS

FIG. 5 is a detailed view of a guiding means attached to the door and to the fuselage of the rotorcraft.

FIG. 6 is a detailed view of an attachment between a guiding rod and the fuselage of the rotorcraft by means of an auxiliary spherical bearing.

FIG. 7 is a detailed view of an auxiliary guiding rail suitable for guiding a spherical bearing of the pivoting means.

DETAILED DESCRIPTION OF THE INVENTION

Figure 1:
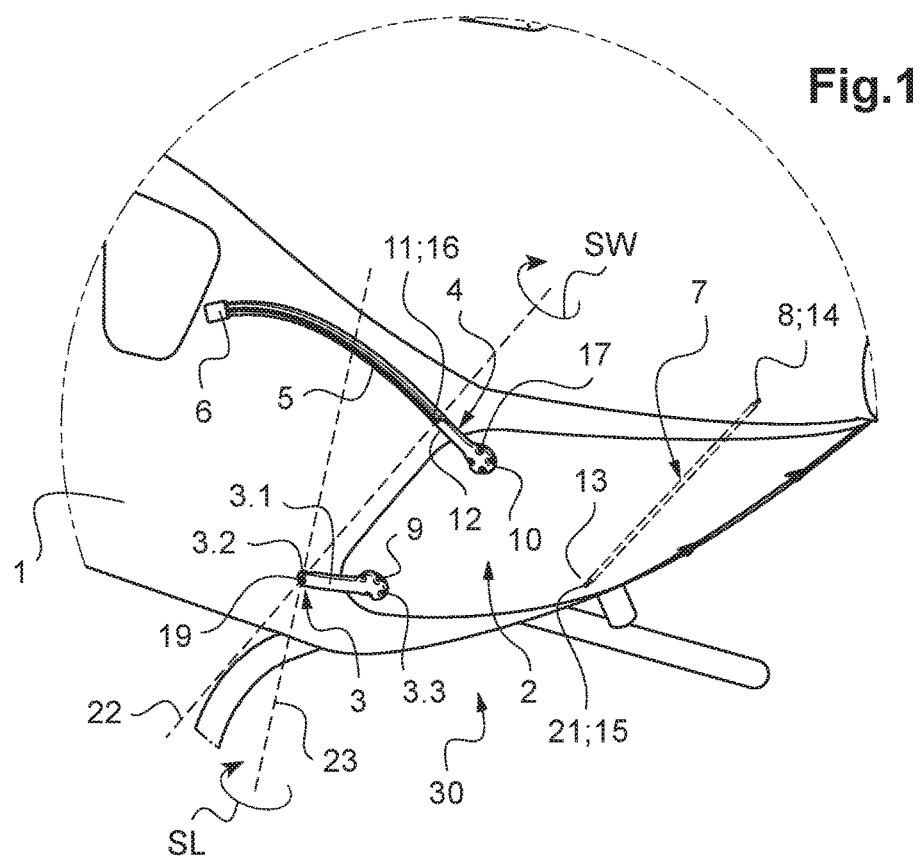
FIG. 1 is a perspective view of the rear part of a rotorcraft comprising the inventive arrangement and a door in a closed, flush position.

FIG. 1 shows the rear part of a rotorcraft 30, whose back door 2 is connected to the fuselage 1 of the rotorcraft 30 by means of the inventive arrangement. In the embodiment depicted in this figure, the door 2 is flush with the fuselage 1, in a closed position.

The arrangement of this embodiment comprises a pivoting means 3 attached to a first attachment point 9 located on a first corner of the door 2 and guiding means 4 attached to a second attachment point 10 located on an adjacent second corner of the door 2.

The pivoting means 3 of this example comprises a main body 3.1 extending between a first edge 3.3 and a second edge 3.2. The first edge 3.3 is attached to the first attachment point 9 of the door, and the second edge 3.2, attached to the fuselage 1, comprises a spherical bearing 19 that allows the free rotation SW, SL of the door, with the second edge 3.2 as a fixed point and the main body 3.1 and the first edge 3.3 being able to move integrally with the door 2. The separation between the first 3.3 and second 3.2 edges by means of the main body 3.1 of the pivoting means 3 makes this arrangement suitable for doors 2 which can be flush with the fuselage 1. This configuration of the pivoting means 3 permits its attachment to the fuselage 1 and to a closed, flush door 2.

Figure 3:
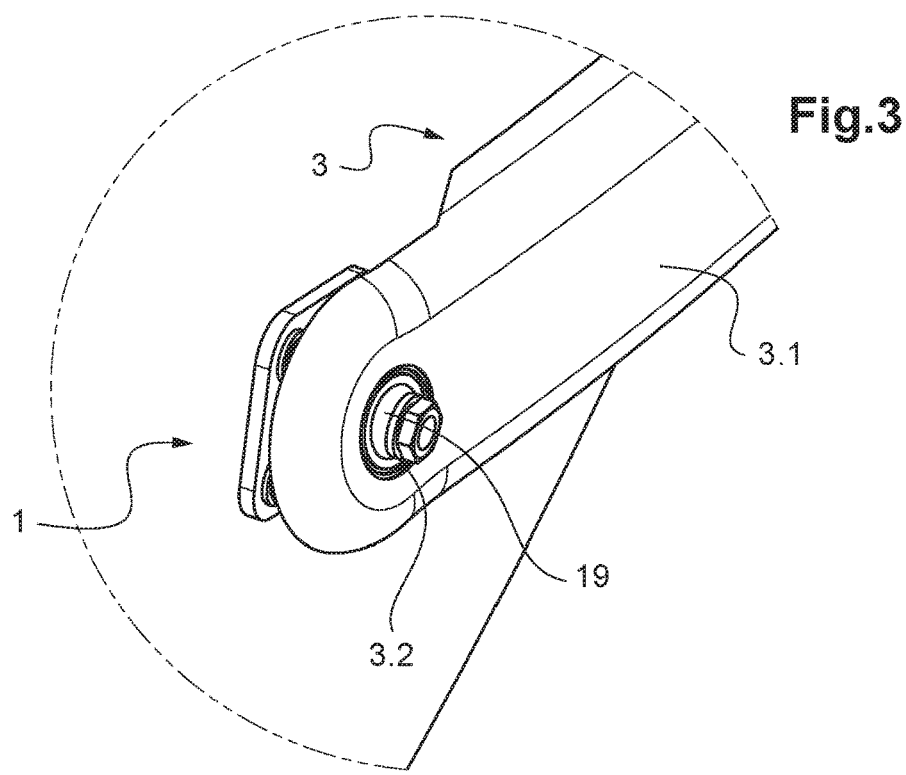
FIG. 3 is a detailed view of an attachment between a pivoting means of the arrangement and a fuselage of the rotorcraft by means of a spherical bearing.

The attachment between the pivoting means 3 and the fuselage 1 is depicted in greater detail in FIG. 3. The spherical bearing 19 is located, in this embodiment, in the middle of the first edge 3.2 in order to make the integral rotation of remaining part of the pivoting means 3 and the door 2 possible.

The embodiment of FIG. 7 is also intended for allowing a door 2 which is flush with the fuselage 1 in a closed position to be in an offset position when open. To achieve this, an auxiliary guiding rail 18 is provided, along which the spherical bearing 19 can move, thus leading the first attachment point 9 of the door 2, integral with the spherical bearing 19, from the flush position to the offset, cleared position.

Figure 4:
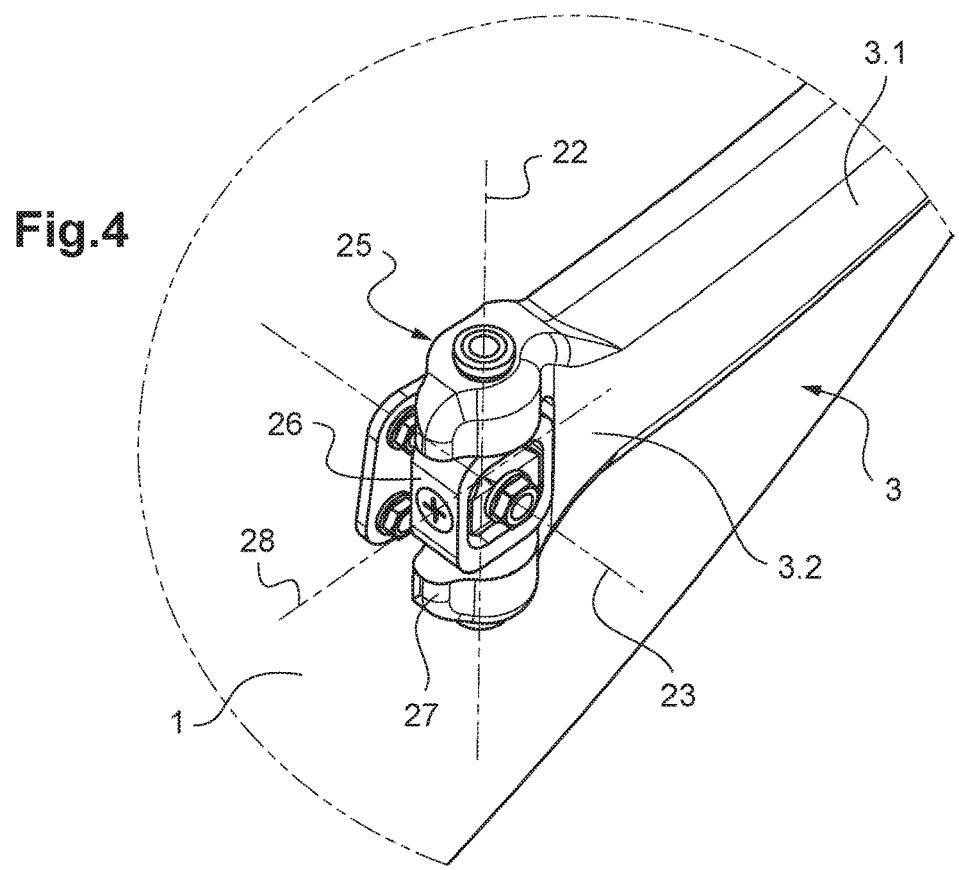
FIG. 4 is a detailed view of an attachment between the pivoting means of the arrangement and the fuselage of the rotorcraft by means of an articulated joint.

FIG. 4 represents an alternative embodiment of the pivoting means 3, whose second end 3.2 comprises an articulated joint 25 instead of a spherical bearing 19. The articulated joint 25 in turn comprises at least a first 26 and a second 27 joint extensions, the first joint extension 26 extending along the slide axis 23 and the second joint extension 27 extending along the at least one swing axis 22. A longitudinal axis 28 is provided to confer the articulated joint with movement around three axes. It should be noted that a configuration with two axes, namely the at least one swing axis 22 and the slide axis 23, is perfectly possible. The door 2 and the remaining part of the pivoting means 3 pivot integrally around the slide axis 23 associated to the first joint extension 26 and rotate about the at least one swing axis 22 associated to the second joint extension 26, the swing axis changing its position as the door 2 and the remaining part of the pivoting means 3 pivot around the slide axis 23.

In the embodiment of FIG. 1, the guiding means 4 comprises an arm 12 extending between a first 17 and a second 16 extremities, the first extremity 17 being attached to the second attachment point 10 of the door 2, and the second extremity 16 comprising a slider 11. This embodiment is further shown, in detail, in FIG. 5. The slider 11 is intended for sliding along a guiding rail 5 which, in FIG. 1, is attached to the fuselage 1 and has the shape of an arc of circumference, as a particular example of a curve on a sphere, whose center is the center of the spherical bearing 19. Such configuration facilitates the sliding motion of the door 2 when pivoting around the slide axis 23 that passes through the center of the spherical bearing 19.

The arrangement of this embodiment further comprises a guiding rod 7 articulately attached to the fuselage 1 and to a third attachment 13 point of the door 2. The guiding rod 7 is suitable for providing guidance of the door 2 during both the swinging and the sliding motions.

The guiding rod 7 of this example extends between a first end 14 and a second end 15, the first end 14 being articulately attached to the fuselage 1 by means of a first pivoting link 8, and the second end 15 being articulately attached to the third attachment point 13 of the door 2 by means of a second pivoting link 21, the first 8 and second 21 pivoting links allowing the relative rotation of the guiding rod 7 with regard to the fuselage 1 and to the door 2, respectively. The first 8 and second 21 pivoting links comprise first and second auxiliary spherical bearings, in an embodiment. A detail of this embodiment is shown in FIG. 6—the guiding rod 7 is linked to the internal wall of the fuselage 1 through the first end 14, which comprises, in its center, the first auxiliary spherical bearing that allows the relative rotation of the guiding rod 7.

In the embodiment of FIG. 1, a stopper 6 is provided at an end point of the guiding rail 5 for impeding a further movement of the slider 11 along the guiding rail 5.

Figure 2:
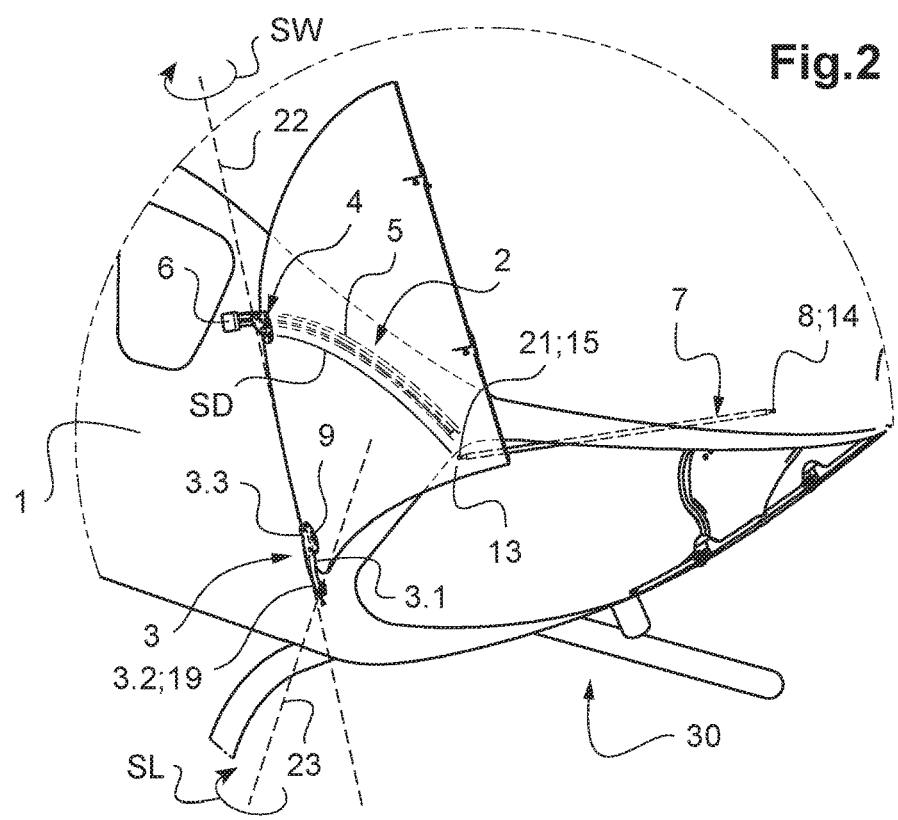
FIG. 2 is a perspective view of the rear part of the rotorcraft comprising the inventive arrangement and the door in a swung out, slid position.

The door 2 of FIG. 2 is in a swung out position, after a swinging motion resulting from a swing rotation SW around the swing axis 22. Besides, the slider 11 has slid along a slide distance SD along the guiding rail 5, after a sliding motion of the door consequence of a slide rotation SL around the slide axis 23.

In the embodiment of this figure, the swing axis 22 passes through the center of the spherical bearing 19 and through the second extremity 16 of the arm 12 of the guiding means 4. Thus, such second extremity 16 of the arm 12 is the swing point of the guiding means 4 of the present embodiment, and the door 2 swings integrally with the arm 12 and with the first extremity 17 of the guiding means 4.

REFERENCE LIST

1.—Structure/Fuselage
2.—Door
3.—Pivoting means
3.1—Main body
3.2—Second edge
3.3—First edge
4.—Guiding means
5.—Guiding rail
6.—Stopper
7.—Guiding rod
8.—First pivoting link
9.—First attachment point
10.—Second attachment point
11.—Slider
12.—Arm
13.—Third attachment point
14.—First end
15.—Second end
16.—Second extremity
17.—First extremity
18.—Auxiliary guiding rail
19.—Spherical bearing
21.—Second pivoting link
22.—Swing axis
23.—Slide axis
25.—Articulated joint
26.—First joint extension
27.—Second joint extension
28.—Longitudinal axis
30.—Rotorcraft
SW.—Swing rotation
SL.—Slide rotation
SD.—Slide distance

What is claimed is:

1. An arrangement for moving a door, the door being configured to close an opening of a structure, and the arrangement comprising:

pivoting means attachable to the structure and to a first attachment point of the door, the pivoting means being suitable for allowing a rotation of the door around a plurality of axes of rotation of the pivoting means, the plurality of axes of rotation comprising a slide axis and at least one swing axis, wherein the pivoting means comprises a spherical bearing suitable for allowing a free rotation of the door around a center of rotation of the spherical bearing, the slide axis and the at least one swing axis passing through the center of rotation of the spherical bearing, a guiding rail attachable to the structure,
guiding means attachable to a second attachment point of the door and comprising a slider for moving along the guiding rail, the guiding means being suitable for allowing the door to slide over the guiding rail while pivoting around the slide axis, and for allowing the door to swing about the at least one swing axis, the at least one swing axis passing through a swing point of the guiding means.

2. The arrangement according to claim 1, wherein the guiding means comprises an arm extending between a first and a second extremities, the first extremity being attachable to the second attachment point of the door, and the second extremity comprising the slider.

3. The arrangement according claim 1, wherein the guiding rail has a shape comprising a portion of a curve on a sphere.

4. The arrangement according to claim 1, further comprising a guiding rod articulately attachable both to the structure and to a third attachment point of the door, the guiding rod being suitable for providing guidance of the door.

5. The arrangement according to claim 1, wherein at least one stopper is provided at at least one point of the guiding rail for impeding a further movement of the slider along the guiding rail.

6. A door assembly comprising the door and the arrangement for moving the door according to claim 1, such that the door is configured to close the opening of the structure, and the arrangement comprises:
the pivoting means attachable to the structure and attached to the first attachment point of the door, the pivoting means being suitable for allowing the rotation of the door around the plurality of axes of rotation of the pivoting means, the plurality of axes of rotation comprising the slide axis and the at least one swing axis,
the guiding rail attachable to the structure,
the guiding means attached to the second attachment point of the door and comprising the slider for moving along the guiding rail, the guiding means being suitable for allowing the door to slide over the guiding rail while pivoting around the slide axis, and for allowing the door to swing about the at least one swing axis, the at least one swing axis passing through the swing point of the guiding means.

7. The door assembly according to claim 6, wherein the door comprises a door edge having at least a first and a second corners, the first attachment point of the door being located at the first corner and the second attachment point of the door being located at the second corner.

8. The door assembly according to claim 7, further comprising a guiding rod attachable to the structure and attached to a third attachment point of the door, the guiding rod being suitable for providing guidance of the door, wherein the third attachment point of the door is located at the inside of an area defined by the door edge.

9. A vehicle comprising the door assembly according to claim 6, such that the door is configured to close the opening of the structure of the vehicle.

10. The vehicle of claim 9, wherein the vehicle is an aircraft and the structure is a fuselage of the aircraft.

11. The aircraft of claim 10, wherein the pivoting means comprises a main body extending between a first edge and a second edge, the first edge being attached to the first attachment point of the door and the second edge being attached to the fuselage, and wherein a spherical bearing is located at the second edge, the spherical bearing being suitable for allowing a free rotation of the door around a center of rotation of the spherical bearing, the slide axis and the at least one swing axis passing through such center of rotation of the spherical bearing.

12. The aircraft of claim 10, wherein the pivoting means comprises a spherical bearing and an auxiliary guiding rail, the auxiliary guiding rail being attached to the fuselage and being suitable for guiding the spherical bearing to a position offset from the fuselage.

13. A method for operating a door of a vehicle according to claim 9, the method at least comprising the steps of:
swinging the door about an at least one swing axis passing through a swing point of guiding means and through a point of pivoting means, so that the door is suitable for opening and closing an opening of a structure and for folding and unfolding with respect to the structure, and
sliding the door over a guiding rail by means of the pivoting of the door around a slide axis which passes through the pivoting means and by means of the movement along the guiding rail of a slider of the guiding means, the guiding means being attached to the door.

14. The arrangement according to claim 1, wherein the pivoting means comprises a main body extending from a first edge to a second edge, the first edge configured for attachment to the first attachment point of the door and the second edge configured for attachment to a fixed point on the fuselage via the spherical bearing.

15. A door assembly comprising:
a structure defining an opening;
a door configured to close the opening of the structure, the door comprising a door edge having at least first and second corners, the door comprising a first attachment point located at the first corner and a second attachment point located at the second corner; and
an arrangement for moving the door comprising:
pivoting means attachable to the structure and to the first attachment point of the door, the pivoting means configured to allow rotation of the door around a slide axis and at least one swing axis, wherein the pivoting means comprise a spherical bearing configured to allow a free rotation of the door around a center of rotation of the spherical bearing, wherein the slide axis and the at least one swing axis pass through the center of rotation of the spherical bearing,
a guiding rail attachable to the structure, and
guiding means attachable to the second attachment point of the door and comprising a slider for moving along the guiding rail, the guiding means configured to allow the door to slide over the guiding rail while pivoting around the slide axis, and configured to allow the door to swing about the at least one swing axis, the at least one swing axis passing through a swing point of the guiding means.

16. The door assembly of claim 15 wherein the door has a third attachment point located at the inside of an area defined by the door edge; and
wherein the door assembly further comprises a guiding rod attachable to the structure and attached to the third attachment point of the door, the guiding rod configured to guide of the door.

17. The door assembly according to claim 15, wherein the pivoting means comprises an articulated joint in turn comprising at least first and second joint extensions, wherein the first joint extension extends along the slide axis and the second joint extension extends along the at least one swing axis.

* * * * *